United States Patent [19]

Guinn

[11] Patent Number: 5,240,037

[45] Date of Patent: Aug. 31, 1993

[54] GAS LINE CHECK VALVE

[76] Inventor: Gene A. Guinn, Route 1, Box 96, Alva, Okla. 73717

[21] Appl. No.: 978,563

[22] Filed: Nov. 19, 1992

[51] Int. Cl.$^5$ ............................................. F16K 15/06
[52] U.S. Cl. .................................. 137/515.7; 137/538; 137/543
[58] Field of Search ...................... 137/515.7, 540, 543, 137/538

[56] References Cited

U.S. PATENT DOCUMENTS

| | | | |
|---|---|---|---|
| 2,602,631 | 7/1952 | Eichmeyer | 251/144 |
| 2,624,587 | 1/1953 | Watson et al. | 137/538 X |
| 2,943,639 | 7/1960 | Smith | 137/557 |
| 3,995,658 | 12/1976 | Hager | 137/543 |
| 4,203,466 | 5/1980 | Hager | 137/543 |
| 4,273,155 | 6/1981 | Euerle | 137/515.7 X |
| 4,391,295 | 7/1983 | Stipe | 137/515.7 X |
| 4,485,844 | 12/1984 | Vander Kaay et al. | 137/515.7 |
| 4,543,986 | 10/1985 | Byrne | 137/515.7 |
| 4,782,855 | 11/1988 | Scaramucci | 137/527.8 |
| 4,911,196 | 3/1990 | Kemp | 137/540 X |

FOREIGN PATENT DOCUMENTS 1254858  11/1971  United Kingdom ............. 137/515.7

Primary Examiner—John Rivell
Attorney, Agent, or Firm—Robert K. Rhea

[57] ABSTRACT

A low pressure gas flow check valve is formed by a relatively thin disc having an central aperture and valve seat is adapted to be interposed between adjacent flanges in a pipeline. The check valve includes a valve body axially connected with one face of the disc. The valve body has inlet and outlet bores and a valve for seating on the valve seat and is surrounded by the bore of the pipeline. A spring normally urges the valve to its sealed position to prevent downstream fluid tending to flow in an upstream direction.

3 Claims, 1 Drawing Sheet

GAS LINE CHECK VALVE

BACKGROUND OF THE INVENTION

This invention relates to gas well production and more particularly to a check valve to prevent back flow of gas to a producing gas well.

1. Field of the Invention

It is difficult to obtain accurate gas measurement on low volume gas wells situated in old fields on account of pipeline pressure changes as result of fluid in the line down stream from a meter. When these pressure changes occur the gas reverse flow through the meter toward the producing well registers a very wide differential line above and below zero on the meter chart. This is usually interpreted as gas produced and the pipeline company pays for gas they never receive.

In a gas gathering system, the gas lines from producing gas wells are connected together and the gas conveyed by a single line to a processing plant which prepares the gas, such a by removing water therefrom, and pumping it to consumers.

Water is sometimes produced with or collects by condensation in the gas line and where the gas line passes over a rise in the earth's surfaces or under a highway right-of-way for example, water collects on the down hill or gas production side in the gas line and gas pressure must be increased by the producing well or wells until sufficient pressure is generated to force the water or other liquid over the rise in the gas line or under the highway right-of-way.

Some gas wells have less formation pressure than others and this necessary gas pressure increase in the gas line sometimes results in a back flow of gas into a relatively low formation pressure gas producing well and the above described erroneous reading of gas production from a low pressure gas well and paying royalty a second time on gas previously produced. When the obstruction or water is moved by gas pressure increase through the collection line all wells resume normal gas production.

This invention provides an inline check valve for a low pressure gas producing well flow line which permits gas flow from the gas well to the collection line or system but prevents reverse flow toward the gas well.

2. Description of the Prior Art

Inline liquid and gas back flow check valves are well known in the oil and gas industry. However, the structural requirements and physical dimensions of all commercially available check valves within my knowledge are incapable of being easily interposed between existing bolt flanges in a parted pipeline for preventing a reverse flow of relatively low pressure gas.

The most pertinent patent is believed to be U.S. Pat. No. 2,602,631, issued to Eickmeyer, Jul. 8, 1952, for Check Valve. This patent discloses a centrally divided flange connected valve body having opposing converging ends interposed between respective ends in a parted pipeline for preventing back flow of water from irrigation lines into the water well.

The valve body contains a valve seat and a piston-like valve moved upstream toward and away from the seat by a spring surrounding a valve guiding stem projecting downstream.

U.S. Pat. No. 4,782,855, issued Nov. 8, 1988, to Scaramucci, for Check Valve Seat and Cage Retainer, and U.S. Pat. No. 4,485,844, issued Dec. 4, 1984, to Vander Kaay et al, for Back Pressure Valve Inducer, are believed to represent the state-of-the-art.

The Scaramucci patent discloses a ring-like cage member supporting a disc or clapper moved toward and away from an axial seat in the cage by gravity and fluid flow is interposed in a fluid line.

The Vander Kaay et al patent discloses a annular valve seat interposed in a fluid line forming a port. A valve member supported from the upstream side of the valve seat is spring forced toward the valve seat.

This invention is believed distinctive over these and other patents of the prior art by providing a flat disc having a central bore forming a valve seat and is interposed between flanges of adjacent joints in a pipeline.

A valve body containing a spring urged valve moveable toward and away from the valve seat is secured to the disc downstream face within the bore of the downstream pipe joint surrounding the valve body, the valve body being provided with a plurality of fluid outlet ports.

SUMMARY OF THE INVENTION

A relatively thin centrally bored disc or plate, having a valve seat, and an outside diameter is freely received within the axial circular area between pipeline gas meter flanges defined by the flange bolts securing the flanges together.

A generally cylindrical valve body having axial cylindrical bores slideably receiving a spring biased valve, moveable toward and away from the valve seat, is secured at its valve head end to the downstream face of the disc. A plurality of radial outlet ports communicate with the cylindrical bores for fluid passage in a downstream direction.

The principal object of this invention is to provide a check valve occupying a minimum of axial space when interposed between adjacent cooperating flanges joining adjacent ends of pipe in a pipeline for preventing back flow of fluid in an upstream direction across the position of the valve.

DESCRIPTION OF THE PREFERRED EMBODIMENTS

Figure 1:
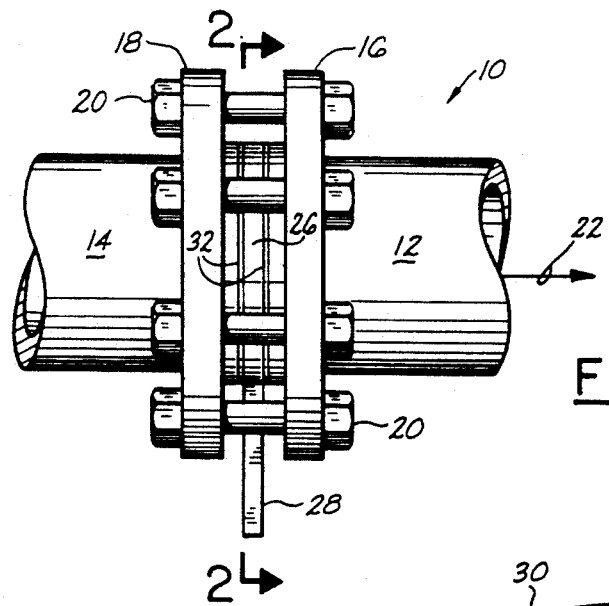
FIG. 1 is a fragmentary side elevational view illustrating the check valve installed in a gas line.
Figure 2:
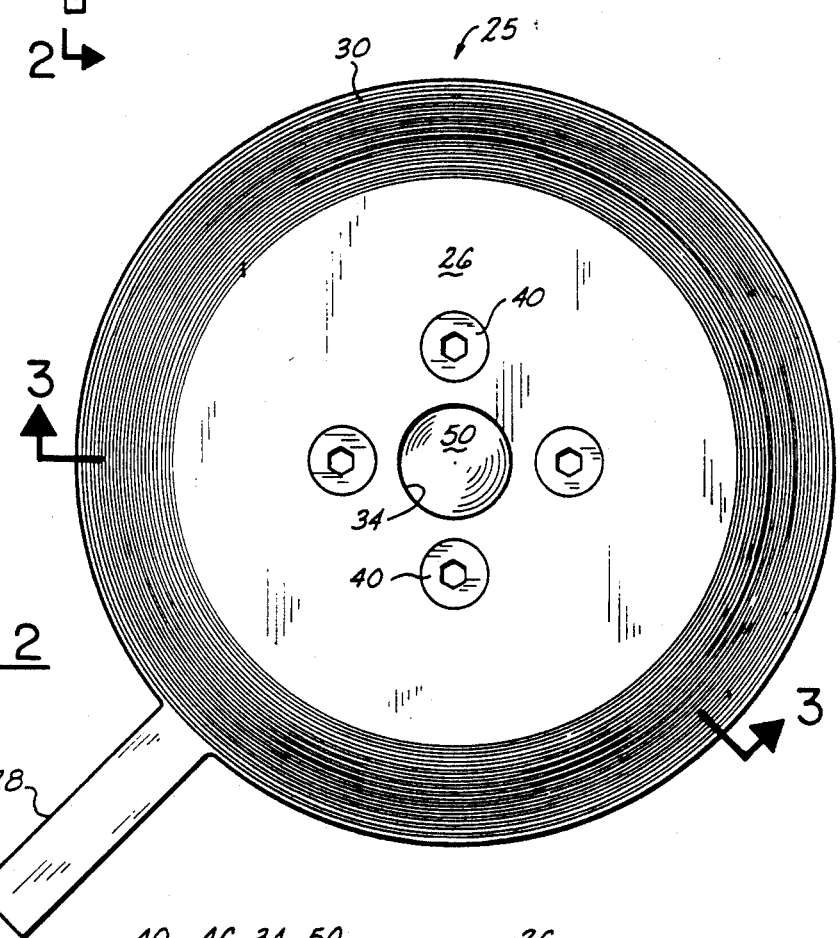
FIG. 2 is an end elevational view, to a larger scale, looking in the direction of the arrows 2—2 of FIG. 1; and, FIG. 3 is a vertical cross sectional view taken substantially along the line 3—3 of FIG. 2.

Like characters of reference designate like parts in those figures of the drawings in which they occur.

In the drawings:

The reference numeral 10 indicates a fragment of a pipeline formed by axially aligned pipe end portions 12 and 14, respectively, having flanges 16 and 18 secured thereto and cooperatively joined by a plurality of bolts 20 defining a flow passage in a desired direction as indicated by the arrow 22.

The reference numeral 25 indicates the check valve as a whole having a relatively thin, when compared with its diameter, disc 26. Diametrically the disc is sized to be freely disposed axially between the flanges within the circular area defined by the bolts 20 securing the flanges 16 and 18. An ear 28 projecting radially outward from the disc perimeter and beyond the flange perimeter between adjacent bolts 20 permits manually positioning the disc axially while tightening the bolts.

The perimeter edge portion of the disc is provided with a series of annular indentations or serrations 30 in its respective faces, only one series being shown, which seal with gaskets 32 when interposed between the flanges 16 and 18. The disc 26 is further centrally apertured as at 34 to form an inlet port and a downstream facing valve seat 36.

A cylindrical valve body 38, diametrically preferably less than one-half the diameter of the disc 26, is axially secured to the downstream face 39 of the disc 26 around the inlet port 34 by plurality (4) bolts 40 spaced 90°.

Figure 3:
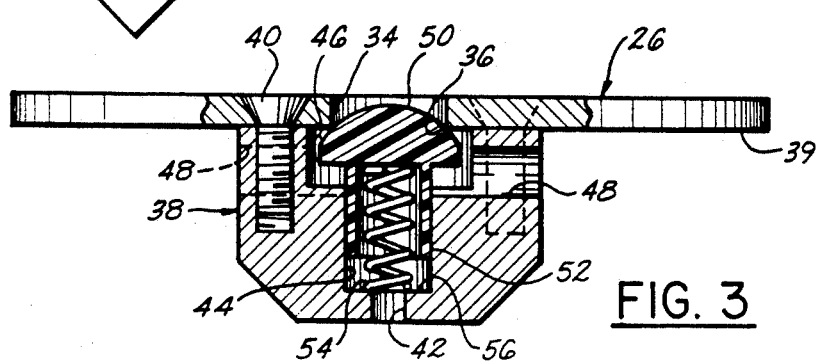

The valve body 38 is centrally bored, as at 42, and counterbored as at 44 and 46 and is further diametrically bored adjacent its disc connected end by a pair of bores 48 spaced 90°, only one being shown (FIG. 3), in staggered relation between the position of the valve body connecting bolts 40 to form fluid outlet ports.

A valve having a substantially hemispherical head end portion 50, preferably formed from light weight elastomeric material, is axially disposed within the counterbore 46 with its hemispherical end facing the valve seat 36.

The valve includes a sleeve-like stem portion 52 having a length less than the length of the cylinder forming counterbore 44 which slideably receives the valve stem 52 for movement of the valve toward and away from the seat 36.

A spring 54 is interposed between the inward end of the valve sleeve 52 and the shoulder 56 formed by the downstream end of the cylinder 44 for normally biasing the valve head upstream to close the inlet port.

OPERATION

In operation the valve 25 is installed, as described hereinabove and gas, not shown, flowing in the direction of the arrow 22 unseats the valve 50 to permit gas flow therethrough.

At any time the gas flow is interrupted as a result of fluid accumulating in the pipeline, as described hereinabove, the spring immediately moves the valve 50 to seal with its seat 36. Thus, interrupting any gas or liquid moving in an upstream direction across the position of the valve 25.

Obviously the invention is susceptible to changes or alterations without defeating its practicability. Therefore, I do not wish to be confined to the preferred embodiment shown in the drawings and described herein.

I claim:

1. A check valve for use between flanges, comprising:
   a disc having upstream and downstream planar end surfaces for mating with adjacent flanges,
   said disc having an axial bore forming an inlet port and a downstream facing valve seat;
   a cylindrical valve body axially secured to the downstream surface of said disc,
   said valve body having an axial upstream open cylindrical bore and having an outlet port;
   a valve for seating on said seat and closing the disc bore and having a sleeve-like stem slidably supported by said cylindrical bore for valve movement toward and away from said seat; and,
   a helical spring interposed between said valve and the downstream limit of the cylindrical bore for biasing said valve toward said seat.

2. The check valve according to claim 1 in which the outlet port includes:
   at least one radial body bore communicating with the cylindrical bore.

3. A check valve for use between bolt flanges, comprising:
   a disc having planar end surfaces for mating with adjacent flanges,
   said disc having an axial bore forming an inlet port and a downstream facing valve seat;
   a valve body secured to one surface of said disc, said valve body having axial upstream open cylindrical bores and a plurality of radial outlet bores communicating with the cylindrical bores;
   a valve for seating on said seat and closing the disc bore and having a sleeve-like stem slidably supported by one said cylindrical bore for valve movement toward and away from said seat; and,
   a helical spring interposed between said valve and the downstream limit of the cylindrical bore for biasing said valve toward said seat.

* * * * *